United States Patent
Ponnusamy

(10) Patent No.: US 7,317,070 B1
(45) Date of Patent: Jan. 8, 2008

(54) PROCESS FOR THE PREPARATION OF POLYAMINO ACIDS

(75) Inventor: Ettigounder Ponnusamy, Ballwin, MO (US)

(73) Assignee: Sigma-Aldrich Co., St. Louis, MO (US)

( * ) Notice: Subject to any disclaimer, the term of this patent is extended or adjusted under 35 U.S.C. 154(b) by 102 days.

(21) Appl. No.: 11/077,450

(22) Filed: Mar. 10, 2005

Related U.S. Application Data

(60) Provisional application No. 60/552,633, filed on Mar. 12, 2004.

(51) Int. Cl.
*C08G 69/10* (2006.01)

(52) U.S. Cl. .......................... 528/328; 424/43; 424/45; 424/46; 514/772.1; 548/530

(58) Field of Classification Search ............... 424/43, 424/45, 46; 514/772.1; 528/328; 548/530
See application file for complete search history.

(56) References Cited

U.S. PATENT DOCUMENTS

| | | | | |
|---|---|---|---|---|
| 3,350,365 A | * | 10/1967 | Wakasa et al. | 528/312 |
| 3,594,351 A | * | 7/1971 | Uchida et al. | 528/60 |
| 3,635,909 A | * | 1/1972 | Fujimoto et al. | 528/328 |
| 4,450,150 A | | 5/1984 | Sidman | |
| 5,258,446 A | | 11/1993 | Enomoto et al. | |
| 5,571,940 A | * | 11/1996 | Palacios | 562/556 |
| 6,479,665 B2 | | 11/2002 | Cornille et al. | |
| 6,515,017 B1 | | 2/2003 | Li et al. | |
| 6,603,016 B2 | | 8/2003 | Cornille et al. | |
| 6,630,171 B1 | | 10/2003 | Huille et al. | |

OTHER PUBLICATIONS

Weiwei Tian et al., The Journal of Macromol Chem., 196, 3891-3903 (1995) Poly(L-lactic acid)—OCH2 CH2 CH2—NH2 and synthesis thereof as a initiator for the polymerization of N-carboxyanhydrides in the synthesis of poly(L-lactide)-block-poly(.alpha.-amino acid)s.*

Goodman et al., "α-Amino Acid N-Carboxyanhydride Polymerizations—A Mechanistic Analysis", Pure and Applied Chemistry, vol. 53, 1981, p. 699-714.

* cited by examiner

*Primary Examiner*—Terressa Boykin
(74) *Attorney, Agent, or Firm*—Senniger Powers; Brian K. Stierwalt; Jeffrey Wilson

(57) ABSTRACT

Among the various aspects of the present invention is an improved process for the preparation of polyamino acids generally, and more specifically, polyglutamic acid and polyaspartic acid. Another aspect is a process for the large scale (i.e. >1 kg) preparation of polyamino acids; particularly polyglutamic and polyaspartic acid.

32 Claims, No Drawings

PROCESS FOR THE PREPARATION OF POLYAMINO ACIDS

REFERENCE TO RELATED APPLICATIONS

This application claims the benefit under 35 USC 119(e) of U.S. Provisional Application No. 60/552,633 filed Mar. 12, 2004, the entire disclosure of which is hereby incorporated by reference.

BACKGROUND OF THE INVENTION

The present application is generally directed to the preparation of polyamino acids. In one embodiment, the polyamino acids are homopolymers and copolymers of polyglutamic acid, polyaspartic acid and other amino acids. Polyamino acids and esters of polyamino acids are known and have a wide variety of uses. For example, U.S. Pat. No. 5,258,446 discloses polyamino acid resins for use in coating artificial leather, synthetic resin sheets or plastic products. The polyamino acid resins are $C_1$-$C_4$ or benzyl esters of polyglutamate and polyaspartate prepared from the polymerization of the corresponding N-carboxyanhydrides. In addition, U.S. Pat. No. 4,450,150 and U.S. Pat. No. 6,630,171 disclose copolymers of polyglutamic acid and polyglutamate which are pharmaceutically acceptable matrices for drugs or other active substances wherein the copolymer controls the rate of drug release. Additionally, U.S. Pat. No. 6,515,017 discloses derivatization of taxol with polyglutamic acid, polyaspartic acid and polylysine to increase the water solubility of taxol.

Polyglutamic acid and other polyamino acids have been prepared by a variety of routes. For example, U.S. Pat. No. 4,450,150 discloses a process wherein a benzyl glutamate/ethyl glutamate copolymer is debenzylated to produce a glutamic acid/ethyl glutamate copolymer. U.S. Pat. No. 6,630,171 discloses a process wherein polyglutamic acid/ethyl glutamate copolymers are prepared by (a) synthesis of a copolymer of polyglutamate with two different blocking groups (selected from $C_1$-$C_4$ alkyl and benzyl) followed by selective elimination of one of the types of blocking groups; (b) synthesis of a $C_1$-$C_4$ or benzyl glutamate homopolymer followed by partial elimination of some of the ester groups; or (c) synthesis of polyglutamic acid followed by partial esterification. Commercially, polyglutamic acid has been prepared by reaction of the benzyl glutamic acid, N-carboxyanhydride with a polymerization initiator to produce polybenzyl glutamate which was dried until the water content was <0.3%. This reaction was followed by acidic hydrolysis with HBr, isolation of the polyglutamic acid by extraction with acetone and subsequent proton exchange which provided the sodium salt of polyglutamic acid. Following proton exchange, the product was dialyzed and lyophilized. Upon analysis, if the benzyl content was >0.2 mole %, the mixture was subjected to acidic hydrolysis with HBr again, followed by isolation of the polyglutamic acid by extraction with acetone, proton exchange which provided the sodium salt of polyglutamic acid, dialysis and lyophilization. In addition to removal of the benzyl group from the side chain, the acidic hydrolysis cleaved the amide backbone of the polymer which produces polyglutamic acid with a lower molecular weight.

SUMMARY OF THE INVENTION

Among the various aspects of the present invention is an improved process for the preparation of polyamino acids generally, and more specifically, polyglutamic acid and polyaspartic acid. Another aspect is a process for the large scale (i.e. >1 kg) preparation of polyamino acids; particularly polyglutamic and polyaspartic acid.

Briefly, therefore, the present invention is directed to a process for the preparation of a polyamino acid. The process comprises (i) forming a reaction mixture comprising a N-carboxyanhydride compound and a metal alkoxide initiator, (ii) polymerizing the N-carboxyanhydride compound to form a polymer having a mass-average molecular weight of at least 10,000 and a repeat unit, the repeat unit comprising an alkyl ester moiety having the formula —C(O)OR$_1$, and (iii) hydrolyzing the alkyl ester moiety of the repeat unit in the presence of a base to form a polyamino acid, wherein the N-carboxyanhydride corresponds to Formula 1

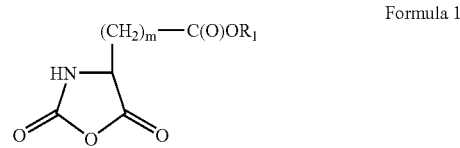

Formula 1 the polymer repeat unit corresponds to Formula 2

Formula 2 the polyamino acid comprises a repeat unit corresponding to Formula 3

Formula 3

$R_1$ is alkyl;
m is 1 or 2;
n is an integer; and
X is hydrogen or an alkali metal.

Other objects and features of this invention will be, in part, apparent and, in part, pointed out out hereinafter.

DETAILED DESCRIPTION OF THE PREFERRED EMBODIMENTS

Advantageously, polyglutamic acid, polyaspartic acid and other polyamino acid polymers comprising glutamic acid or aspartic acid repeat units may be prepared in accordance with the process of the present invention in a relatively more efficient and/or productive manner. In general, the polyamino acid comprises a repeat unit corresponding to Formula 3

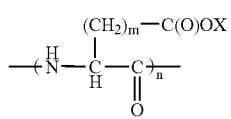

Formula 3 wherein m is 1 or 2;

n is an integer; and

X is hydrogen or an alkali metal.

In one embodiment, the polyamino acid is a homopolymer of glutamic acid or aspartic acid. Alternatively, however, the polyamino acid may be a random or block copolymer of glutamic acid and aspartic acid, a random or block copolymer of either glutamic acid or aspartic acid (but not both) and one or more other amino acids, or a random or block copolymer of glutamic acid, aspartic acid, and at least one other amino acid.

Generally, the homopolymers or copolymers of glutamic acid, aspartic acid or other amino acids may be comprised of D or L isomers of the amino acid repeat units.

Regardless of the composition of the repeat units, the process of the present invention enables the preparation of polyamino acids having a molecular weight (mass average) in excess of 10,000. For certain applications, polyamino acids having an average molecular weight of 11,000 to 23,000 are desired. For other applications, polyamino acids having an average molecular weight of 50,000 to 100,000 are desired. For yet other applications, polyamino acids having an average molecular weight in excess of 100,000 are desired. The process of the present invention may advantageously be controlled to provide polyamino acids having a molecular weight within each of these ranges.

When the polyamino acid is to be used as a water solubilizing group for small organic molecules such as taxol, it is generally preferred that the polyamino acid be a homopolymer of glutamic acid. Furthermore, for this and other similar pharmaceutical applications it is generally preferred that the polyamino acid contain an amount of glutamate or aspartate repeat units that is less than about 0.5 mole %; preferably less than about 0.2 mole %; for example, it is generally preferred that no glutamate or aspartate repeat units be detected in the polyamino acid when the polyamino acid is analyzed using nuclear magnetic resonance (NMR).

1. Preparation of a Polymerization Reaction Mixture

Polyamino acids of the present invention may be prepared from a reaction mixture comprising a N-carboxyanhydride of an alkylglutamate or alkylaspartate, a polymerization initiator and a suitable solvent.

The preparation of N-carboxyanhydrides of alkylglutamates and alkylaspartates is known and described, for example, in U.S. Pat. Nos. 6,479,665 and 6,603,016. In general, the alkylglutamate or alkylaspartate is treated with phosgene in an ethereal solvent (e.g., tetrahydrofuran) to produce the corresponding alkylglutamate, N-carboxyanhydride or alkylaspartate, N-carboxyanhydride. In one embodiment, the alkylglutamate or alkylaspartate is an alkyl-L-glutamate, N-carboxyanhydride or alkyl-L-aspartate, N-carboxyanhydride corresponding to Formula 1

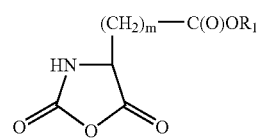

Formula 1 wherein $R_1$ is alkyl, preferably $C_1$-$C_5$ alkyl, and m is 1 (for aspartate) or 2 (for glutamate). $R_1$, for example, may be methyl; ethyl; n- or iso-propyl; n-, iso- or tert-butyl; or straight or branched pentyl. Preferably, $R_1$ is ethyl. Thus, for example, in one embodiment, the N-carboxyanhydride is the N-carboxyanhydride of ethylglutamate and corresponds to Formula 1A.

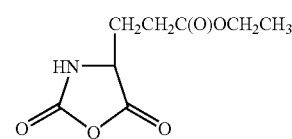

Formula 1A

In general, the polymerization initiator is a nucleophile. In addition, the polymerization initiator preferably possesses physical properties which enable the initiator to be separated from the product polymer or otherwise eliminated from the reaction mixture upon the completion of the polymerization reaction. Exemplary polymerization initiators include metal alkoxides having the formula MOR, wherein M is a metal and R is an alkyl group. For example, the metal may be sodium or potassium. By way of further example, the alkyl moiety may be a linear, branched or cyclic group having 1 to 10 carbon atoms. Presently preferred polymerization initiators include sodium methoxide, sodium ethoxide, sodium propoxide or combinations thereof. Sodium methoxide is presently particularly preferred.

The molar ratio of the N-carboxyanhydride ("NCA") to the polymerization initiator used to form the polymerization reaction mixture may vary over a relatively wide range. In general, the average molecular weight of the resulting polymer tends to decrease as the ratio of the NCA to initiator decreases. To prepare polyamino acid polymers having an average molecular weight in excess of 10,000, therefore, it is generally preferred that the molar ratio of the NCA to the initiator be in the range of about 15:1 to about 25:1, respectively. For the polymerization of N-carboxyanhydride, alkyl-L-glutamate, the molar ratio is preferably about 15:1 to about 20:1; respectively, and more preferably about 15:1, respectively.

The solvent used in the polymerization reaction mixture may generally be any suitable nonpolar solvent. Exemplary solvents include dioxane, chloroform, dichloromethane, acetonitrile, and combinations thereof.

2. Polymerization

Polymerization of the N-carboxyanhydride may be carried out over a range of temperatures and times. For example, polymerization may be carried out for a period of about 12 to about 30 hours, more typically about 18 hours to 24 hours, at a temperature of about 20° C. to about 30° C., more typically about 25° C. to about 30° C., and preferably at about 25° C.

The resulting polymer will contain alkylglutamate repeat units, alkylaspartate repeat units or alkylglutamate and alkylaspartate repeats. In one embodiment, these repeat units generally correspond to Formula 2

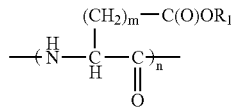

Formula 2 wherein $R_1$ is $C_1$-$C_5$ alkyl; m is 1 or 2; and n is an integer. In general, n will vary depending the target molecular weight of the polymer with "n" typically being at least about 50 for polyalkylglutamate homopolymers, polyalkylaspartate homopolymers, and polyaspartate/polyglutamate copolymers (random or block) having an average molecular weight of at least about 10,000. By way of further example, "n" will typically be about 60 to about 175 for polyalkylglutamate homopolymers, polyalkylaspartate homopolymers, and polyaspartate/polyglutamate copolymers (random or block) having an average molecular weight of about 11,000 to 23,000. By way of further example, "n" will typically be about 250 to about 750 for polyalkylglutamate homopolymers, polyalkylaspartate homopolymers, and polyaspartate/polyglutamate copolymers (random or block) having an average molecular weight of about 50,000 to about 100,000. By way of further example, "n" will typically be greater than about 750 for polyalkylglutamate homopolymers, polyalkylaspartate homopolymers, and polyaspartate/polyglutamate copolymers (random or block) having an average molecular weight of at least about 100,000.

In a preferred embodiment, the repeat unit is a glutamate repeat unit, the alkyl ester substituent of the glutamate repeat unit is ethyl, the repeat unit generally corresponds to Formula 2A.

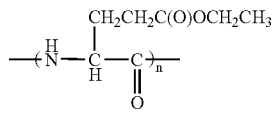

Formula 2A wherein n is as previously defined. In general, n will vary depending the target molecular weight of the polymer with "n" typically being at least about 65 for polyethylglutamate homopolymers having an average molecular weight of at least about 10,000. By way of further example, "n" will typically be about 70 to about 145 for polyethylglutamate homopolymers having an average molecular weight of about 11,000 to 23,000. By way of further example, "n" will typically be about 320 to about 635 for polyethylglutamate homopolymers having an average molecular weight of about 50,000 to about 100,000. By way of further example, "n" will typically be greater than about 635 for polyethylglutamate homopolymers having an average molecular weight of at least about 100,000.

Upon completion of polymerization, the polyamino acid is preferably precipitated in water and filtered.

3. Hydrolysis

The resulting polyamino acid polymer is further treated with a base in an aqueous solvent to hydrolyze the alkyl group of the repeat unit (see Formula 2) to produce a polyamino acid repeat unit represented by Formula 3

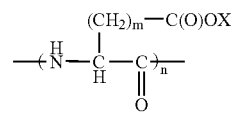

Formula 3 wherein X may be hydrogen or a metal; m is 1 or 2; and n is an integer. X, for example, may be a monovalent metal. Preferably, X is an alkali metal.

The agent used for the hydrolysis reaction is a base, and preferably a base that completely dissociates in aqueous solution (i.e., a "strong" base). Exemplary bases include NaOH, KOH, RbOH and the like. In one embodiment, preferably, the base is NaOH, KOH or a combination thereof. In another embodiment, the base is NaOH.

The solvent used for the hydrolysis reaction is preferably an alcoholic solvent or a mixture of alcoholic solvents. Exemplary alcoholic solvents are alcoholic solvents containing a straight or branched alkyl chain having 1 to 4 carbon atoms. In one embodiment, the solvent is methanol, ethanol or propanol. In a more preferred embodiment, the solvent is methanol or ethanol, more preferably ethanol.

The hydrolysis step is reacted for about 5 hours to about 7 hours; preferably, for about 6 hours to about 7 hours; particularly, for about 6 hours. In addition, the hydrolysis step is reacted at about 20° C. to about 30° C.; preferably, at about 25° C. to about 30° C.; particularly at about 25° C.

In one embodiment, the repeat unit is a glutamic acid salt repeat unit and the hydrolyzed product corresponds to Formula 3A

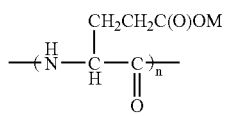

Formula 3A wherein n is an integer and M is a metal.

In another embodiment, the repeat unit is a glutamic acid repeat unit and the hydrolyzed product corresponds to Formula 3B

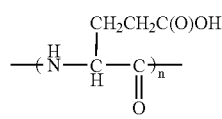

Formula 3B wherein n is an integer.

A polymer repeat unit of formula 3B is prepared from a polymer repeat unit of formula 3A by reducing the pH of the solution by treating the solution with an acid. The acid is capable of reducing the pH of the solution sufficiently to protonate the carboxylic acid moiety of the repeat unit. A variety of acids can be utilized; for example, HCl, HBr, HI, $H_2SO_4$, $HClO_4$, and the like.

After formation of polyamino acids wherein the polymer repeat units correspond to formulae 3, 3A and 3B, the product is diluted with an equal volume of water and dialyzed. The dialyzed product is collected and lyophilized to yield the product of formulae 3, 3A or 3B in its pharmaceutically acceptable form.

The following examples illustrate the invention.

EXAMPLES

The techniques used for the polymerization of the N-carboxyanhydrides (NCA) to polymers are known to those skilled in the art and are given in detail in the review article by M. Goodman and E. Peggion, Pure and Applied Chemistry, volume 53, p. 699,1981 and the book by H. R. Kricheldorf "Alpha amino acids-N-Carboxyanhydrides and Related Heterocycles", Springer Verlag (1987). The following syntheses specify the synthesis of poly-L-glutamic acid, sodium using gamma ethyl-L-glutamate, N-carboxyanhydride.

Example 1

Preparation of Poly-L-Glutamic Acid, Sodium Polymer Using gamma ethyl-L-glutamate, N-carboxyanhydride Synthesis of poly-L-glutamic acid, sodium:

Polymerization: 201 g (1.0 mole) of gamma ethyl-L-Glu NCA was dissolved in 5 liter of 1,4-dioxane to make a 0.2M solution. The NCA solution was transferred to a 12 liter three neck RB flask equipped with mechanical mixing and a water bath at a temperature of 25-30° C. 66.7 ml of 1 N sodium methoxide (0.0667 moles) was placed in 100 ml of 1,4-dioxane. The sodium methoxide solution was added to the NCA solution in one portion with vigorous mixing. The polymerization solution was mixed for 1 hour and held at 25-30° C. for 18-24 hours. Process time: 1 day Isolation of the protected polymer: The polymer solution was precipitated in a 10 liter volume of deionized water with vigorous mixing for 30 minutes. The poly-gamma ethyl-L-glutamate was filtered on a Buchner funnel and washed with 1 liter of deionized water and 1 liter of methanol. The solids were collected as wet solids. Then 4 liters of methanol was added and the mixture was stirred for 15 minutes to break up the lumps in the solids. The polymer was left immersed in methanol for 18-24 hours to remove the trapped 1,4-dioxane. The solids were filtered, washed with 1 liter of methanol and collected as wet solids. The complete drying of the polymer resulted in incomplete deprotection. Process time: 2 days Deprotection and sodium salt preparation: The wet protected polymer was transferred to a 6 liter Erlenmeyer flask and mechanically mixed. 1,600 ml of 2N ethanolic sodium hydroxide (~8 ml/g NCA) was added and the resultant mixture was mixed at 25-30° C. for 6 hours. Approximately 3,200 ml of deionized water was added and mixed for 30 minutes at 20-25° C. resulting in a clear solution of poly-L-glutamic acid, sodium. Process time: 1 day Dialysis and lyophilization (freeze drying): The poly-L-glutamic acid, sodium solution was dialyzed against running deionized water using ~12,000 molecular weight cut off dialysis tubings to remove the oligomers and salts. The dialyzed solution was collected, filtered through a 0.2 micron filter and lyophilized (freeze dried) to get the solid poly-L-glutamic acid, sodium polymer. Process time: 3 days Yield: 77%. Proton NMR showed the complete removal of the ethyl group (absence of methyl peak). Molecular weight by GPC MALS (Multi-angle laser light scattering): 21,230. Also measured specific rotation in 0.2 M sodium chloride solution at 25° C. (−69 degrees).

Example 2

Preparation of Poly-L-Glutamic Acid, Sodium Polymer Using gamma ethyl-L-glutamate, N-carboxyanhydride Synthesis of poly-L-glutamic acid, sodium:

Polymerization: 402 g (2.0 mole) of gamma ethyl-L-Glu NCA was dissolved in 10 liter of 1,4-dioxane to make a 0.2M solution. The NCA solution was transferred to a 22 liter three neck RB flask equipped with mechanical mixing and a water bath at a temperature of 25-30° C. 40 ml of 1 N sodium methoxide (0.04 moles) was placed in 100 ml of 1,4-dioxane. The sodium methoxide solution was added to the NCA solution in one portion with vigorous mixing. The polymerization solution was mixed for 1 hour and held at 25-30° C. for 18-24 hours. Process time: 1 day Isolation of the protected polymer: The polymer solution was precipitated in a 20 liter volume of deionized water with vigorous mixing for 30 minutes. The poly-gamma ethyl-L-glutamate was filtered on a Buchner funnel and washed with 2 liter of deionized water and 2 liter of ethanol. The solids were collected as wet solids. Then 4 liters of ethanol was added and the mixture was stirred for 15 minutes to break up the lumps in the solids. The polymer was left immersed in ethanol for 18-24 hours to remove the trapped 1,4-dioxane. The solids were filtered, washed with 2 liter of ethanol and collected as wet solids. The complete drying of the polymer results in incomplete deprotection. Process time: 2 days Deprotection and sodium salt preparation: The wet protected polymer was transferred to a 6 liter Erlenmeyer flask and mechanically mixed. 3,200 ml of 2N ethanolic sodium hydroxide (~8 ml/g NCA) was added and the resultant mixture was mixed at 25-30° C. for 5 hours. Approximately 3,200 ml of deionized water was added and mixed for 30 minutes at 20-25° C. resulting in a clear solution of poly-L-glutamic acid, sodium. Process time: 1 day Dialysis and lyophilization (freeze drying): The poly-L-glutamic acid, sodium solution was dialyzed against running deionized water using ~12,000 molecular weight cut off dialysis tubings to remove the oligomers and salts. The dialyzed solution was collected, filtered through a 0.2 micron filter and lyophilized (freeze dried) to get the solid poly-L-glutamic acid, sodium polymer. Process time: 3 days Yield: 73%. Proton NMR showed the complete removal of the ethyl group (absence of methyl peak). Molecular weight by GPC MALS (Multi-angle laser light scattering): 37,830. Also measured specific rotation in 0.2 M sodium chloride solution at 25° C. (−60.7 degrees).

COMPARATIVE EXAMPLE

Preparation of Poly-L-Glutamic Acid, Sodium Polymer Using gamma benzyl-L-glutamate, N-carboxyanhydride Synthesis of poly-L-glutamic acid, sodium:

Polymerization: 120 g (0.456 mole) of gamma benzyl-L-Glu NCA was dissolved in 2.28 liter of 1,4-dioxane to make a 0.2M solution. The NCA solution was transferred to a 5 liter three neck RB flask equipped with mechanical mixing and a water bath set at 25-30° C. 9.1 ml 1 N sodium methoxide (0.0091 moles) was diluted with 100 ml of 1,4-dioxane. The sodium methoxide solution was added to the NCA solution in one portion with vigorous mixing. The polymerization solution was mixed for 1 hour and held at 25-30° C. for 18-24 hours. Process time: 1 day Isolation of the protected polymer: The polymer solution was precipitated in a 5 liter volume of deionized water with vigorous mixing for 30 minutes. The poly-gamma benzyl-L-glutamate was vacuum filtered on a Buchner funnel and washed with 2×2 liters of deionized water followed by 2 liters of methanol. The solids were collected and 3 liters of methanol was added with mixing for 15 minutes to break up the lumps in the solids. The polymer was immersed in methanol for 18-24 hours to remove trapped 1,4-dioxane. The solids were filtered, washed with 1 liter of methanol and dried under vacuum over phosphorus pentoxide until the water content was <0.2%. Complete drying was required to minimize the acid hydrolysis of polymer chain during the deprotection step. Yield of the protected polymer: 73%. Process time: 7 days Deprotection (removal of benzyl group) and isolation of free acid: The dry protected polymer was transferred to a 5 liter three neck RB flask fitted with mechanical mixing and a drying tube. 510 ml (~7 ml/g of protected polymer) of glacial acetic acid was added and mixed for 15 minutes to make a homogeneous slurry. 1,095 ml of 30% hydrobromic acid in acetic acid (15 ml/g of protected polymer) was added and mixed at 25-30° C. for 18-20 hours. After the reaction period, the reaction mixture was cooled with an ice water bath, 2,000 ml of acetone was added and the reaction product was mixed for 30 minutes. Subsequently, mixing was stopped and the polymer was allowed to settle for 2 to 3 hours. The supernatant was decanted, 2,000 ml of acetone was added and mixed for 5 minutes, after which the precipitate was allowed to settle for 30 minutes. After settling, the supernatant was decanted, 2,000 ml of acetone was added and the mixture was filtered in a Buchner funnel. The solids were washed with 3×1,000 ml of acetone and the deprotected poly-L-glutamic acid, free acid was collected. Process time: 2 days Sodium salt preparation: The deprotected poly-L-glutamic acid, free acid was transferred into a 4 liter beaker fitted with magnetic mixing, a pH meter and nitrogen bubbling. Subsequently, 1.5 liter of deionized water was added followed by slow addition of 1 N sodium hydroxide to the vigorously mixed poly-L-glutamic acid slurry and the pH was maintained at ~11. Once all the solids were dissolved, the solution was mixed for 2 hours at pH ~11 with nitrogen bubbling. Process time: 1 day Dialysis and lyophilization: The poly-L-glutamic acid, sodium solution was dialyzed against running deionized water using ~12,000 molecular weight cut off dialysis tubings to remove the oligomers and salts. The dialyzed solution was collected, filtered through a 0.2 micron filter and lyophilized (freeze dried) to get the solid poly-L-glutamic acid, sodium polymer. Process time: 3 days Yield: 71%. Proton NMR showed ~1% benzyl group present.

Rework to remove/reduce the residual benzyl group to a minimum by treating with 30% hydrobromic acid in acetic acid: In a 5 liter three neck RB flask, 49 g of poly-L-glutamic acid, sodium polymer was added to 539 ml glacial acetic acid and mixed for 10 minutes followed by addition of 196 ml of 30% hydrobromic acid in acetic acid and mixing for 30 minutes. Next, 1.5 liter of acetone was added with vigorous mixing and cooling in an ice water bath to control the exotherm followed by mixing for 5 minutes. After mixing, the precipitate was allowed to settle for 1 hour. The supernatant was decanted, 1.5 liter acetone was added and the mixture was filtered. The solids were washed with 4×1,000 ml of acetone and the poly-L-glutamic acid, free acid was collected. Process time: 2 days Sodium salt preparation: The poly-L-glutamic acid, free acid collected from the rework step above was transferred into a 4 liter beaker fitted with magnetic mixing, pH meter and nitrogen bubbling and 1.5 liter of deionized water was added. Then, 1 N sodium hydroxide was added slowly to the vigorously mixed poly-L-glutamic acid slurry where the pH was maintained at ~11. Once all the solids were dissolved, the solution was mixed for 2 hours at pH ~11 with nitrogen bubbling. Process time: 1 day Dialysis and lyophilization: The poly-L-glutamic acid, sodium solution was dialyzed against running deionized water using ~12,000 molecular weight cut off dialysis tubings to remove the oligomers and salts. The dialyzed solution was collected, filtered through a 0.2 micron filter and lyophilized (freeze dried) to get the solid poly-L-glutamic acid, sodium polymer. Process time: 3 days Overall Yield: 60% (from NCA). Proton NMR showed ~0-0.1% benzyl group present. Molecular weight by GPC MALS (Multi-angle laser light scattering): 22,670. Also measured specific rotation in 0.2 M sodium chloride solution at 25° C. (−67 degree).

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A process for the preparation of a polyamino acid, the process comprising (i) forming a reaction mixture comprising a N-carboxyanhydride compound and a metal alkoxide initiator, (ii) polymerizing the N-carboxyanhydride compound to form a polymer having a mass-average molecular weight of at least 10,000 and a repeat unit, the repeat unit comprising an alkyl ester moiety having the formula —C(O)OR$_1$ and (iii) hydrolyzing the alkyl ester moiety of the repeat unit in the presence of a base to form a polyamino acid, wherein the N-carboxyanhydride corresponds to Formula 1

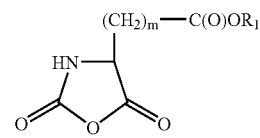

the polymer repeat unit corresponds to Formula 2

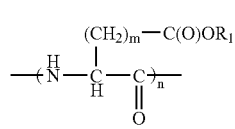

Formula 2 the polyamino acid comprises a repeat unit corresponding to Formula 3

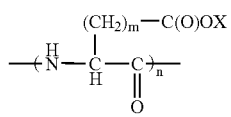

Formula 3

$R_1$ is alkyl;
m is 1 or 2;
n is an integer; and
X is hydrogen or a metal; and
wherein the polyamino acid has less than about 0.5 mole % of repeat units containing the moiety $R_1$ when analyzed by NMR.

2. The process of claim 1 wherein the polyamino acid has less than about 0.2 mole % of repeat units containing the moiety $R_1$ when analyzed by NMR.

3. The process of claim 1 wherein the polyamino acid has an absence of repeat units containing the moiety $R_1$ when analyzed by NMR.

4. The process of claim 1 wherein the metal alkoxide initiator is sodium methoxide, sodium ethoxide, sodium propoxide, potassium methoxide, potassium ethoxide, potassium propoxide, or mixtures thereof.

5. The process of claim 1 wherein the metal alkoxide initiator is sodium methoxide, sodium ethoxide, sodium propoxide or mixtures thereof.

6. The process of claim 1 wherein the metal alkoxide initiator is sodium methoxide.

7. The process of claim 1 wherein the reaction solution has a N-carboxyanhydride to metal alkoxide initiator molar ratio of about 15:1 to about 25:1.

8. The process of claim 1 wherein the reaction solution has a N-carboxyanhydride to metal alkoxide initiator molar ratio of about 15:1 to about 20:1.

9. The process of claim 1 wherein the reaction solution has a N-carboxyanhydride to metal alkoxide initiator molar ratio of about 15:1.

10. The process of claim 1 wherein the reaction mixture comprising N-carboxyanhydride and metal alkoxide initiator is placed in a solvent selected from the group consisting of dioxane, chloroform, dichloromethane, acetonitrile, and combinations thereof.

11. The process of claim 10 wherein the solvent is dioxane.

12. The process of claim 1 wherein polymerizing the N-carboxyanhydride compound takes place at a temperature of from about 20° C. to about 30° C.

13. The process of claim 1 wherein polymerizing the N-carboxyanhydride compound takes place at a temperature of from about 25° C. to about 30° C.

14. The process of claim 1 wherein polymerizing the N-carboxyanhydride compound takes place at a temperature of about 25° C.

15. The process of claim 1 wherein polymerizing the N-carboxyanhydride compound takes about 12 to about 30 hours.

16. The process of claim 1 wherein polymerizing the N-carboxyanhydride compound takes about 18 to about 24 hours.

17. The process of claim 1 wherein the polymer has a mass-average molecular weight of about 11,000 to about 23,000.

18. The process of claim 1 wherein the polymer has a mass-average molecular weight of about 50,000 to about 100,000.

19. The process of claim 1 wherein the polymer has a mass-average molecular weight of at least about 100,000.

20. The process of claim 1 wherein m is 2.

21. The process of claim 1 wherein $R_1$ is ethyl.

22. The process of claim 1 wherein m is 2 and $R_1$ is ethyl.

23. The process of claim 1 wherein the base is sodium hydroxide, potassium hydroxide, rubidium hydroxide, or mixtures thereof.

24. The process of claim 1 wherein the base is sodium hydroxide.

25. The process of claim 1 wherein hydrolyzing the alkyl ester moiety takes place in an alcoholic solvent.

26. The process of claim 25 wherein the alcoholic solvent is methanol, ethanol, propanol or mixtures thereof.

27. The process of claim 25 wherein the alcoholic solvent is ethanol.

28. The process of claim 1 wherein hydrolyzing the alkyl ester moiety takes about 5 to about 7 hours.

29. The process of claim 1 wherein hydrolyzing the alkyl ester moiety takes about 6 hours.

30. The process of claim 1 wherein $R_1$ is ethyl, m is 2, X is sodium, the base is sodium hydroxide and the polymer has a mass-average molecular weight of about 11,000 to about 23,000.

31. The process of claim 1 wherein $R_1$ is ethyl, m is 2, X is sodium, the base is sodium hydroxide and the polymer has a mass-average molecular weight of about 50,000 to about 100,000.

32. The process of claim 1 wherein $R_1$ is ethyl, m is 2, X is sodium, the base is sodium hydroxide and the polymer has a mass-average molecular weight of at least about 100,000.

* * * * *